June 9, 1942. W. BISSET 2,285,558
LOADING AND UNLOADING CONVEYER APPARATUS
Original Filed March 2, 1939 5 Sheets-Sheet 1
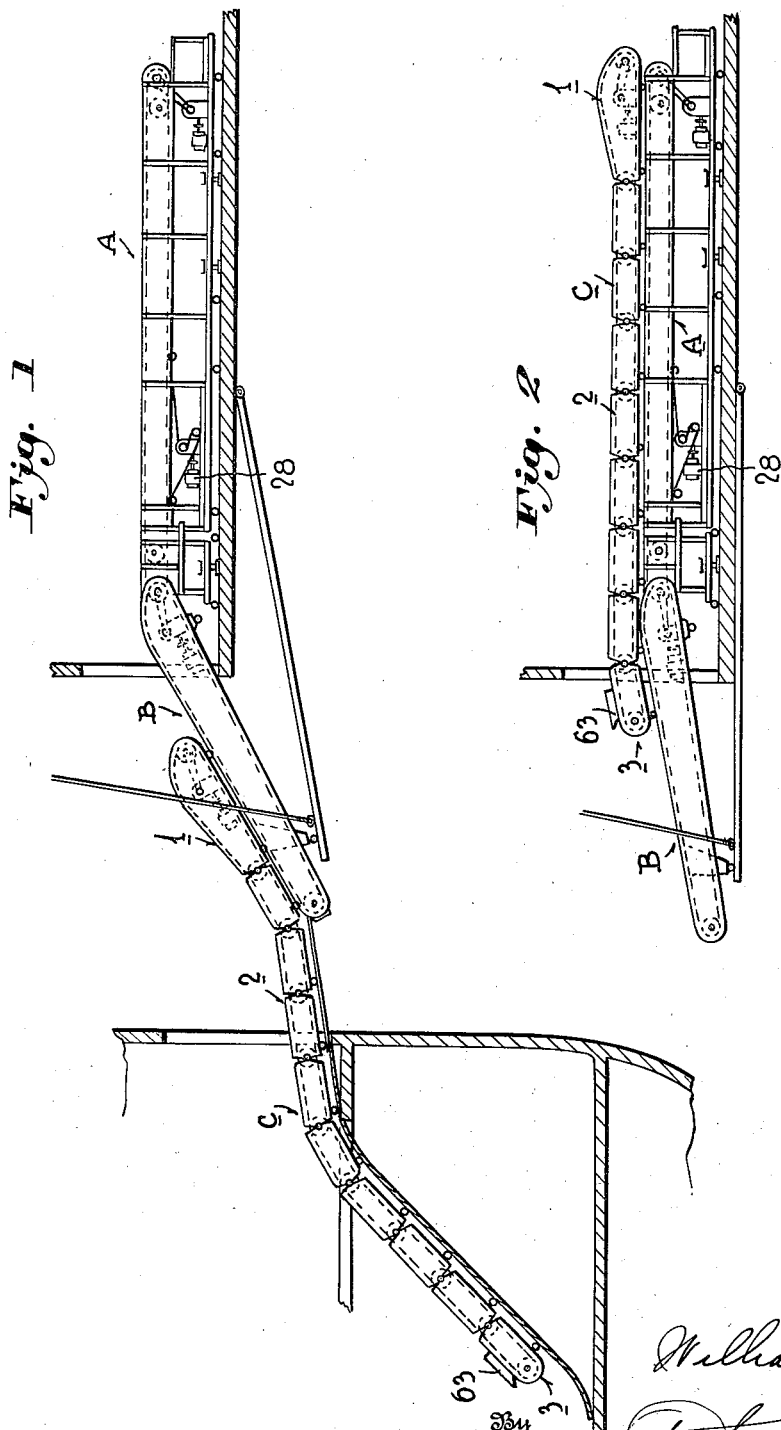

June 9, 1942. W. BISSET 2,285,558
LOADING AND UNLOADING CONVEYER APPARATUS
Original Filed March 2, 1939 5 Sheets-Sheet 2

Inventor.
William Bisset
By Arthur M. Hahn
Attorney

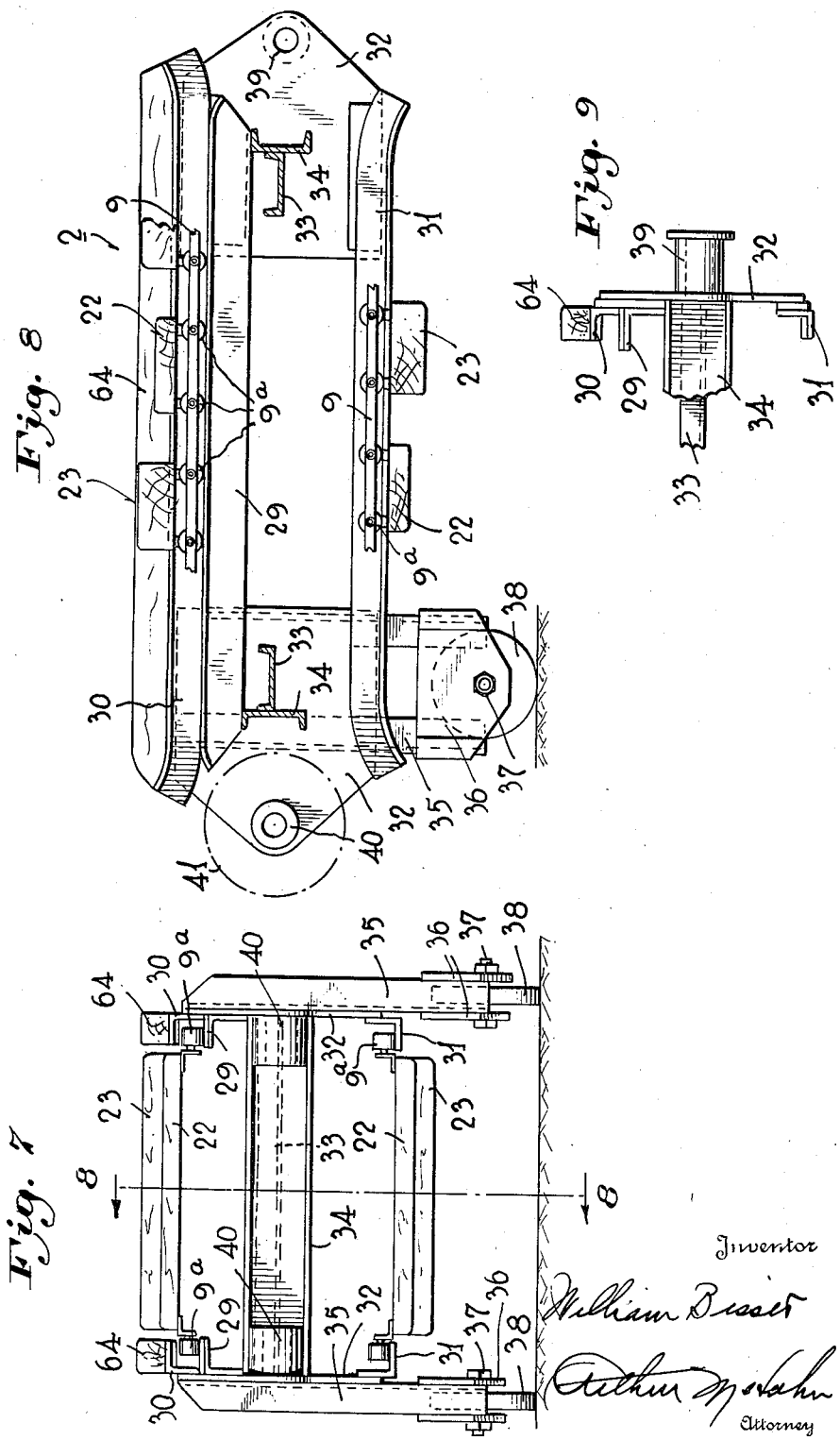

June 9, 1942.  W. BISSET  2,285,558
LOADING AND UNLOADING CONVEYER APPARATUS
Original Filed March 2, 1939  5 Sheets-Sheet 4
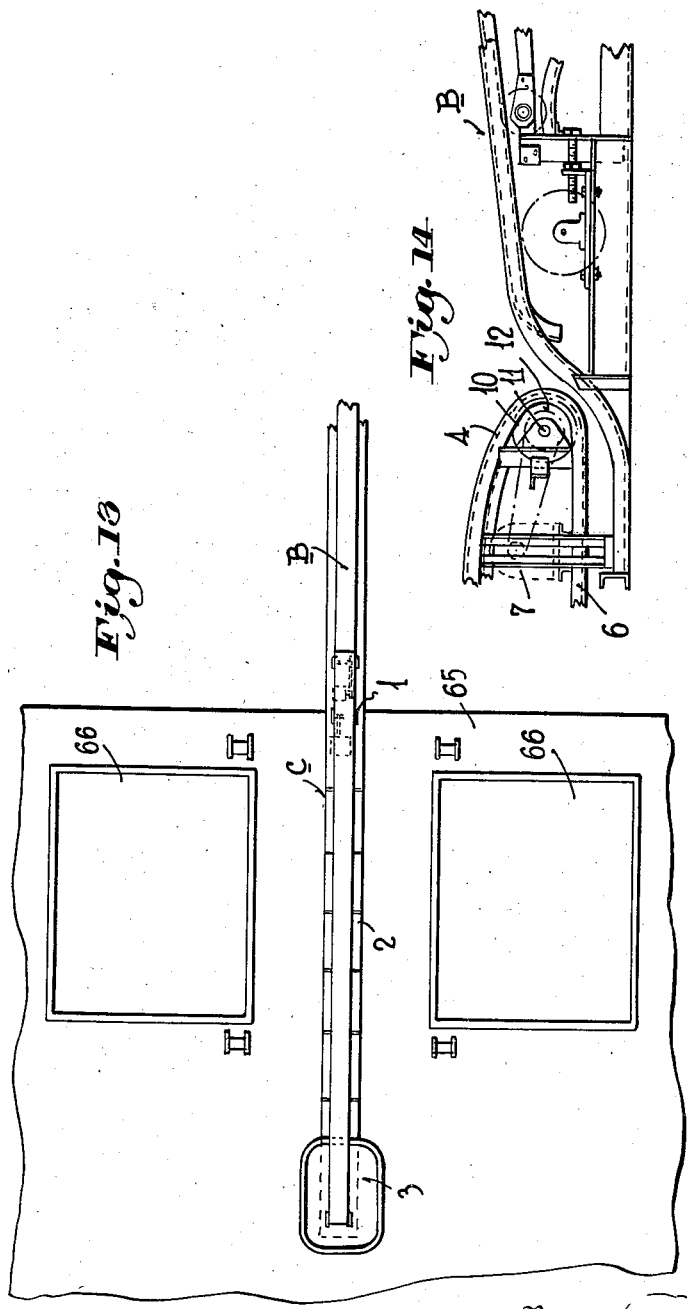
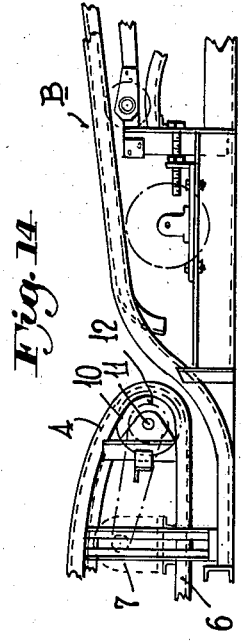
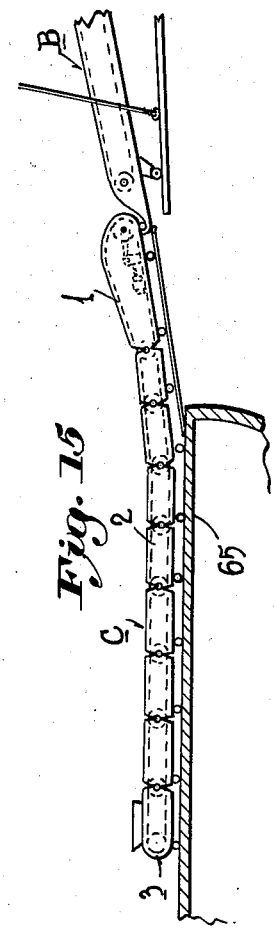

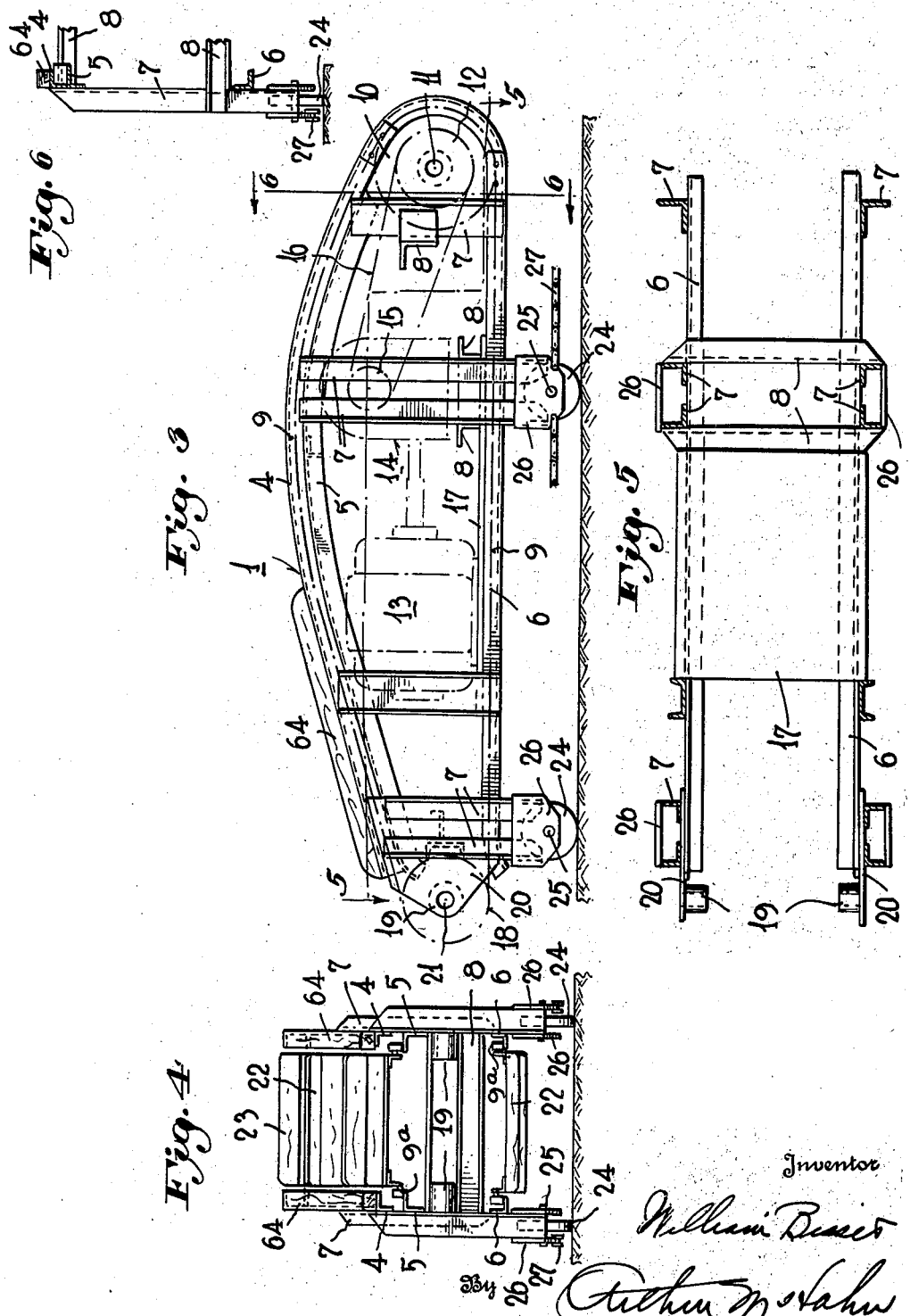

Patented June 9, 1942

2,285,558

UNITED STATES PATENT OFFICE 2,285,558

LOADING AND UNLOADING CONVEYER APPARATUS

William Bisset, Port Hope, Ontario, Canada, assignor, by mesne assignments, to Mathews Conveyer Company, Ellwood City, Pa., a corporation of Pennsylvania Original application March 2, 1939, Serial No. 259,443. Divided and this application April 14, 1941, Serial No. 388,567

1 Claim. (Cl. 198—109)

This invention relates to flexible conveyers and is particularly directed to a flexible conveyer that may be projected into and withdrawn from the hold or other storage space of a boat.

This application covers subject matter which has been divided out of my co-pending application, Serial No. 259,443, filed March 2, 1939 for Loading and unloading conveyer apparatus. The flexible conveyer herein described, although capable of general application, was primarily designed for use with a loading and unloading apparatus such as that disclosed in my aforementioned co-pending application.

The primary object of the present invention is to provide a flexible conveyer which may be easily and quickly projected into or withdrawn from the hold or other cargo space of a carrier such as a ship.

Another object of the invention is to provide a flexible conveyer having an endless conveyer element for moving articles to and from the hold of a ship or other similar cargo space.

Another object of the invention is to provide a conveyer which will flex and bend as it is moved to and from operative position to conform with the contour of the path over which it is moved.

Another object of the invention is to provide a flexible conveyer which will adjust itself to the irregularities of the path along which it is supported and will remain stationary even while conveying heavy materials.

Another object of the invention is to provide a flexible conveyer composed of a plurality of sections which may be easily and economically constructed and joined together.

A further object is to provide a flexible conveyer with power means for moving it to and from operative position.

A still further object is to provide a flexible conveyer consisting of a plurality of sections whereby the length of said conveyer may be easily varied.

With these and other objects in view, the invention may be stated to be the various novel features of construction and arrangement, all of which will be fully described hereinafter and pointed out in the appended claim.

In the drawings accompanying and forming a part of this specification, I have shown an illustrative embodiment of my invention and wherein Figure 1 is a side elevation of a loading and unloading apparatus showing a flexible conveyer in operative position;

Figure 2 is a similar view, but showing the flexible conveyer in inoperative position stored on a shed conveyer;

Figure 3 is a side elevation of the upper or inner end unit of the flexible conveyer;

Figure 4 is an end view thereof as viewed from the left hand end of Figure 3;

Figure 5 is a horizontal sectional view thereof taken on the line 5—5 of Figure 3;

Figure 6 is a fragmentary vertical sectional view taken on the line 6—6 of Figure 3;

Figure 7 is an end elevation of one of the intermediate units comprising the flexible conveyer;

Figure 8 is a longitudinal sectional view taken on the line 8—8 of Figure 7;

Figure 9 is a fragmentary end view thereof as seen from the right hand end of Figure 8;

Figure 13 is a fragmentary top plan view of the loading and unloading apparatus showing the flexible conveyer positioned on the deck of the ship adjacent the cargo hatches;

Figure 11:
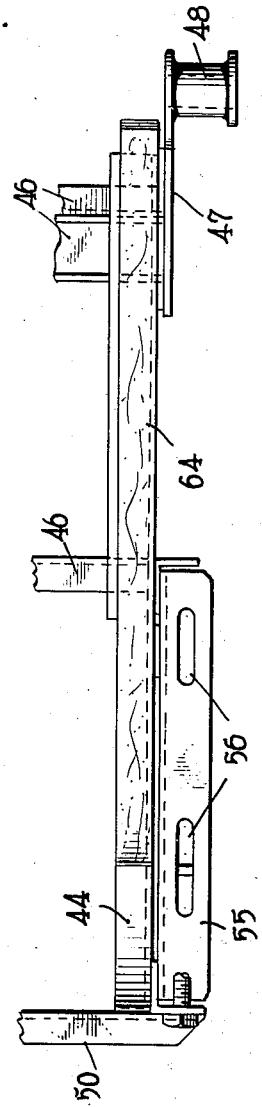
Figure 11 is a fragmentary top plan view thereof with some parts removed.

Figure 14 is a fragmentary vertical sectional view through a modified form of apparatus at the inner end of the flexible conveyer, showing its junction with the intermediate section of the apparatus which is so arranged that the apparatus may be used for loading and unloading a carrier; and Figure 15 is a fragmentary side elevation of the modified form of apparatus showing the flexible conveyer positioned on the deck of the vessel.

As illustrated in Figures 1 and 2, the entire loading and unloading apparatus consists of a shed conveyer A, an intermediate section B, and a flexible conveyer C. The flexible conveyer may be moved by power operated means from its operative position as shown in Figure 1 to its inoperative position as shown in Figure 2 as described in detail in the aforementioned co-pending application.

The flexible conveyer C is composed of a number of interconnected sections or units which include a driving head section 1, a plurality of intermediate sections 2, and a receiving and/or discharging section 3. As clearly shown in Figures 1 and 2, the various sections of the flexible conveyer are pivotally connected together so the conveyer may readily flex or bend to conform, within limits, to regular and irregular curves when it is projected into or withdrawn from the carrier.

The power head section 1, as shown in detail in Figures 3-6, comprises a suitable framework which includes upper guideways formed of longitudinally disposed angle irons 4 and 5 arranged one above the other, and lower guideways formed of angle irons 6. These guideways are supported by uprights 7 and held in transversely spaced relation by angle irons 8 which serve to brace and tie the framework together.

The upper and lower guideways 5 and 6 support the upper and lower runs of endless chains 9 which move along each side of the conveyer on rollers 9a carried by the links of the chains. At the right hand or inner end of head section 1, these chains pass over a pair of sprocket wheels 10 that are secured in spaced relation on a transversely extending shaft 11 which also has a drive sprocket 12 secured thereon. A motor 13, acting through a reduction gear 14, drives a sprocket 15, which in turn drives the sprocket 12 by an endless chain 16. The motor 13 and reduction gear 14 are carried on a platform 17 which is supported between the lower guide rails 6. While I have shown an electric motor 13 as the source of power, obviously any other suitable type of prime mover could be used to drive the conveyer chains 9.

As may readily be seen, the shaft 11 is positioned at the inner or right hand end of the head section. At the other end of the head section, a pair of idler wheels 18 are journalled on bosses 19. These bosses are formed on the inner surfaces of plates 20 of the framework and are hollow so shafts 21 may be inserted therethrough to pivotally connect the power head section with the adjacent intermediate section 2. The idler wheels 18 are aligned longitudinally with the chain guideways. The chains 9 do not pass completely around the idler wheels 18, but merely move tangently over the periphery of these wheels which engage and guide the chains between the head section 1 and the adjacent intermediate section 2. These idler wheels will accurately guide the chains even though the head section 1 is disposed at an angle with respect to the adjacent intermediate section 2.

As shown in Figures 4, 7 and 8, the chains 9 are interconnected by a plurality of wooden pallets 22 and 23 which are attached to transversely aligned rollers 9a to carry a load along the conveyer. The pallets 22 are of less height than those denoted by reference character 23. These pallets are alternately arranged along the conveyer to form pockets or depressions and thus prevent articles such as sacks of grain or flour from sliding along the conveyer. This arrangement of the pallets is particularly useful when the conveyer is disposed at an angle to the horizontal because the pockets formed by the smaller pallets 22 prevent articles from sliding toward the lower end of the conveyer.

The entire power head section 1 is carried by wheels 24 which are mounted on stub shafts 25 extending between plates 26. The plates 26 are secured to the lower ends of uprights 7. A chain 27 is connected to one of the plates on each side of the power head section. This chain is driven by a motor 28 (Figures 1 and 2) whereby the flexible conveyer may be moved from operative position as shown in Figure 1 to storage position on top of the shed conveyer A as shown in Figure 2.

As has already been described, an intermediate section 2 is pivotally connected to the head section 1. Likewise, a plurality of intermediate sections are pivotally connected together with the head section 1 at one end and a receiving and/or discharging station 3 at the other end. All of the intermediate sections 2 are identical in construction, hence a description of one will suffice for all.

One of these intermediate sections is shown in detail in Figures 7-9, and consists of a framework including longitudinally disposed angle irons 29 arranged along each side to support and guide the upper runs of the conveyer chains 9. Similarly arranged angle irons 30 are positioned above the guideways 29 to guard and protect the chains. A pair of reversely disposed and longitudinally extending angle irons 31 are arranged, one on each side of the framework, to provide a support and guideway for the lower or return run of the conveyer chain. The angle irons 29, 30 and 31 are secured to vertically disposed end plates 32 which in turn are tied together by transversely extending channels 33. These members form the framework for the intermediate section 2 which is further braced and strengthened by additional transversely disposed channels 34 secured to channels 33 and plates 32. Adjacent one end of each section, a pair of vertically disposed angle irons 35 are secured to the end plates 32 on each side of the framework. These angle irons are arranged to extend below the lower guideways 31 and have plates 36 secured on each side thereof to provide supports for axles 37. Each of the axles 37 carries a wheel 38 which forms a movable support for the entire intermediate section.

The plates 32 at each end of the section are formed with bearing bosses 39 and 40. It will be noted that bearing bosses 39 at one end of the section are formed on the outer surfaces of the plates, while the bosses 40 at the other end of the section are formed on the inner surfaces of the plates. Thus, when two adjacent intermediate sections 2 are to be pivotally connected together, the end plates of one section with the bosses 39 on the outer surfaces may be arranged to overlap the end plates on the adjacent section having the bosses 40 on the inner surfaces. The four bosses are thus aligned transversely so a shaft may be projected through them to form a pivotal connection between the two intermediate sections. Idler wheels 41, similar to the wheels 18 described in connection with the head section, are journalled on the bosses of each section to guide the conveyer chains 9 between the guideways of the respective sections.

Figure 10:
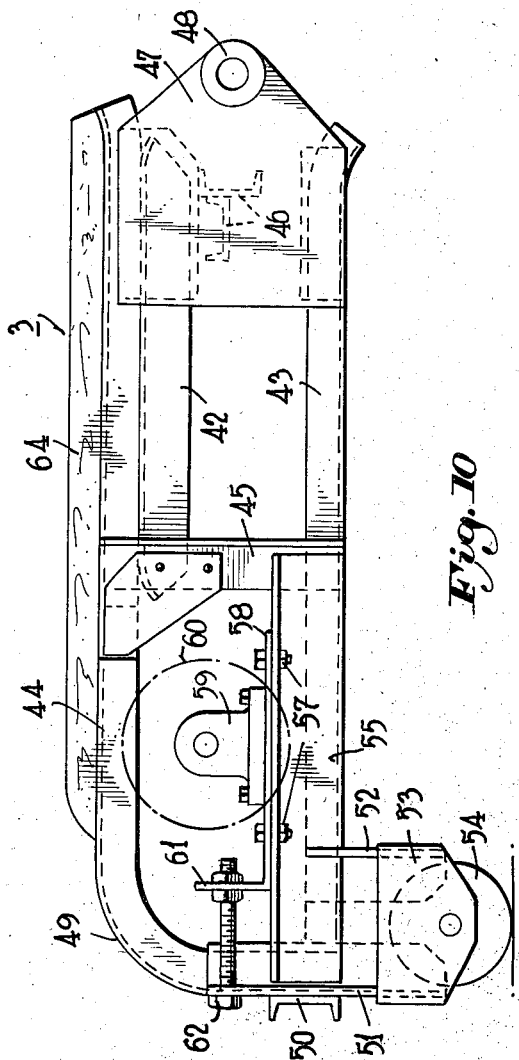
Figure 10 is a side elevation of the lower or outer end unit of the flexible conveyer.
Figure 12:
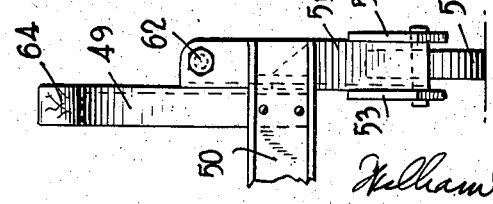
Figure 12 is a fragmentary end view as seen from the left hand end of Figure 11.

The extreme outer or left hand end of the flexible conveyer C as viewed in Figure 1 is fitted with the receiving and/or discharging section 3 shown in detail in Figures 10-12. The framework for this section includes longitudinally disposed angle irons 42 and 43 which form upper and lower guideways, respectively, for the chains 9 and angle irons 44 which serve as a guard for and protect the upper run of the chains. Vertically disposed angle irons 45 and transversely disposed tie channels 46 are secured to the angle irons 42, 43 and 44 to brace and rigidly hold the framework structure. The framework structure also includes end plates 47 secured on the inner or right hand end of the section and having bosses 48 formed on the outer surfaces thereof. These bosses are adapted to receive a shaft to pivotally connect the receiving and/or discharging section 3 to the adjacent intermediate section 2 in a manner similar to that which has been previously described in connection with sections 1 and 2.

At the outer or left hand portion of the section 3, the angle irons 44 are curved downwardly as indicated at 49 and fastened to a transversely extending tie channel 50. Vertically disposed angle irons 51 are secured to and extend below the channel 50 and the lower guideways 43. Shorter but similar angle irons 52 also project below the guideways 43. Bearing plates 53 extend between these angle irons and these plates support an axle on which wheels 54 are journalled to movably support the section 3.

Longitudinally disposed angle irons 55 are arranged along each side of the section adjacent the outer or left hand end thereof as viewed in Figure 10. The horizontally projecting flange of each of these angle irons is formed with slots 56 to receive bolts 57 by which a plate 58 is secured to the framework. The plate 58 carries journal blocks 59 in which sprocket wheels 60 are journalled. The upper guideways 42 terminate adjacent these sprocket wheels so the conveyer chains 9 may pass around the sprocket wheels 60 and thus be accurately guided between their upper and lower runs. One end of the plate 58 has an upturned flange 61 which is operatively engaged with bolts 62 extending through the upper portion of the angle iron 51. As may readily be seen, these bolts provide the usual adjustment of the sprocket wheels 60 and the conveyer chains 9. When the parts are correctly adjusted, suitable nuts on the bolts 57 are tightened to hold the parts in adjusted position.

As indicated in Figures 1 and 2, an upwardly extending hopper 63 may be fitted on the section 3. The purpose of this hopper is to expedite the loading of articles onto the conveyer when it is being used to unload the cargo from a vessel.

In order to prevent chafing or other damage to the articles as they are propelled along the conveyer, the top guideways 4, 30 and 44 of the respective sections are fitted with rails 64 formed of wood or other suitable material.

As may be readily seen, the respective sections of the flexible conveyer are constructed of parts which may be formed from standard stock materials. The angle irons, channels, and plates forming the framework of the sections are all easily made and assembled. By using standard wheels and bearings, the entire conveyer can be made and assembled in the average machine shop. The various parts forming the framework are preferably welded together, but may be secured in any other suitable or approved manner.

In the operation of the flexible conveyer, assuming that it is to be used to unload the cargo in the hold of a boat, power is applied to the prime mover 28 for chains 27, whereby the flexible conveyer C will be pulled off of the shed conveyer A, over the intermediate conveyer B and onto the deck of the boat. As shown in Figure 1, the receiving and/or discharging section 3 is guided through an opening in the deck of the boat and lowered into the hold. The wheels on which the flexible conveyer is mounted permit its movement along the shed conveyer A and the intermediate conveyer B, and also on the decks and runways of the ship. The entire conveyer is driven into place by chains 27. As has been previously described, the pivotal connections formed by the shafts, between the respective sections of unit C make it possible for these sections to follow vertical irregularities during horizontal displacement of the unit. Thus, each section of the conveyer rests on its supporting wheels even though the surfaces on which adjacent sections are supported are disposed at an oblique angle thereto. Once the conveyer is in position, the motor 28 is stopped and the motor 13 may be started to drive the conveyer chains 9 and the pallets connected thereto. Thus, material or articles may be loaded onto the pallets 22 and 23 at the receiving section 3 to be moved along the flexible conveyer and out of the hold of the ship. The idler wheels 18 and 41 which are interposed between each of the units of the flexible conveyer, guide the chains 9, together with the pallets 22 and 23 over the entire length of the conveyer including the irregular portions thereof.

It will be readily seen that the flexible conveyer may be projected into or withdrawn from the various storage spaces of different boats without the use of overhead cranes or any motive force other than that which is supplied to the chains 27. The units of the conveyer will conform to the contour of its path along the decks and runways between decks without special adjustments or apparatus to place it in position for use. The ease with which it is projected into and withdrawn from the storage spaces saves much time in transferring the cargo to and from the boat. In addition, the flexible conveyer is capable of use with all different types of boats without being specially adjusted or assembled. It is, therefore, possible to vary the length of the conveyer merely by changing the number of intermediate sections 2. However, in most installations, it is possible to assemble a conveyer of average length so it will not have to be changed to meet average varying conditions.

In Figures 13–15, the flexible conveyer is shown positioned on the deck 65 of the vessel instead of in the hold as in Figures 1 and 2. With the conveyer positioned in this manner, material may be lifted through hatches 66, and then transferred to shore by the conveyer. These figures also show a slight modification of the connection between the intermediate section B and the driving head section 1 of the flexible conveyer C. In this modification, the pallets 22 and 23 of the flexible conveyer are arranged on substantially the same plane as the pallets of the intermediate conveyer. This arrangement permits the apparatus to be used for both loading and unloading operations.

What I claim is:

A conveyer apparatus of the character described comprising a plurality of sections, pivotal connections securing each of said sections to adjacent sections to form a flexible articulated conveyer apparatus adapted to be projected into and withdrawn from the storage space of a vessel, supports on each of said sections, wheels on said supports whereby said apparatus may be moved as a unit over irregular surfaces leading to said storage space and bend to conform with the irregularities in said surfaces, an endless pallet conveyer journalled in the end sections of said apparatus for transferring articles to and from said storage space, means carried by one of said end sections for driving said pallet conveyer, and power driven chains connected to one end of said flexible apparatus for projecting the same into and withdrawing it from said storage space.

WILLIAM BISSET.